(12) United States Patent
Kim

(10) Patent No.: US 8,823,672 B2
(45) Date of Patent: Sep. 2, 2014

(54) TOUCH PANEL DISPLAY DEVICE

(71) Applicant: Hyun-Chel Kim, Yongin (KR)

(72) Inventor: Hyun-Chel Kim, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 0 days.

(21) Appl. No.: 13/792,711

(22) Filed: Mar. 11, 2013

(65) Prior Publication Data

US 2014/0140036 A1 May 22, 2014

(30) Foreign Application Priority Data

Nov. 20, 2012 (KR) ........................ 10-2012-0131870

(51) Int. Cl.
*G06F 3/041* (2006.01)
(52) U.S. Cl.
CPC ..................................... *G06F 3/041* (2013.01)
USPC ........................................... 345/173; 362/19
(58) Field of Classification Search
USPC ..................................... 345/173–176; 362/19
See application file for complete search history.

(56) References Cited

U.S. PATENT DOCUMENTS

| 6,549,195 B2* | 4/2003 | Hikida et al. .................. 345/173 |
| 2001/0000961 A1* | 5/2001 | Hikida et al. .................. 345/173 |
| 2002/0033919 A1* | 3/2002 | Sanelle et al. ................. 349/122 |
| 2003/0058225 A1* | 3/2003 | Kusuda et al. ................. 345/173 |
| 2003/0122797 A1* | 7/2003 | Bang et al. ..................... 345/173 |
| 2003/0232192 A1* | 12/2003 | Kishioka et al. .............. 428/354 |
| 2010/0253604 A1* | 10/2010 | Peters et al. ..................... 345/30 |

FOREIGN PATENT DOCUMENTS

| JP | 2004-118151 A | 4/2004 |
| JP | 2006-155452 A | 6/2006 |
| KR | 10-2009-0102065 A | 9/2009 |
| KR | 10-2010-0027108 A | 3/2010 |

* cited by examiner

*Primary Examiner* — Mary Ellen Bowman
(74) *Attorney, Agent, or Firm* — Lee & Morse, P.C.

(57) ABSTRACT

A touch panel display device including a display panel displaying an image; a polarizing plate attached onto the display panel; a touch panel on and spaced apart from an upper portion of the polarizing plate; a resin layer between the touch panel and the polarizing plate, the resin layer bonding the touch panel and the polarizing plate; a window on the touch panel; and a reinforcement layer between the window and the touch panel or between the touch panel and the resin layer, wherein the reinforcement layer prevents damage to the touch panel caused by bending stress.

9 Claims, 6 Drawing Sheets

TOUCH PANEL DISPLAY DEVICE

CROSS-REFERENCE TO RELATED APPLICATION

This application claims priority to and the benefit of Korean Patent Application No. 10-2012-0131870 filed in the Korean Intellectual Property Office on Nov. 20, 2012, the entire contents of which are incorporated herein by reference.

BACKGROUND

1. Field

Embodiments relate to a touch panel display device.

2. Description of the Related Art

Display device may include, e.g., a liquid crystal display (LCD), a plasma display panel (PDP), an organic light emitting diode (OLED) display, a field effect display (FED), an eletrophoretic display device, or the like. Recently, the display device itself has been enabled to be bent, folded, or rolled.

A touch panel may be used as an input device is installed in the display device. The touch panel may be classified into a resistive type touch panel, a capacitive type touch panel, and an electro-magnetic type touch panel according to a method for sensing touch of the touch panel.

In case of the capacitive type touch panel, a voltage drop occurs when a conductor (like a finger or a pen) becomes close to an upper glass substrate or touches the upper glass substrate to input a user's command or graph information by detecting a location being touched.

The above information disclosed in this Background section is only for enhancement of understanding of the background of the invention and therefore it may contain information that does not form the prior art that is already known in this country to a person of ordinary skill in the art.

SUMMARY

The embodiments provide a touch panel display device that can help reduce and/or prevent breakage or damage to a touch panel attached to a display device due to bending stress.

A touch panel display device according to an exemplary embodiment includes: a display panel displaying an image; a polarizing plate attached onto the display panel; a touch panel disposed in an upper portion at a distance from the polarizing plate; a resin layer disposed between the touch panel and the polarizing plate to bond the touch panel and the polarizing plate; a window disposed on the touch panel; and a reinforcement layer disposed at least between the window and the touch panel and between the touch panel and the resin layer, and the reinforcement layer may prevent damage to the touch panel due to bending stress.

In this case, the reinforcement layer may be made of an oxide semiconductor.

The reinforcement layer may be made of an oxide semiconductor and a metal.

In this case, the oxide semiconductor may be one of an oxide having zinc, gallium, tin, or indium as a base, complex oxides thereof, such as zinc oxide, indium-gallium-zinc oxide, indium-zinc oxide, or zinc-tin oxide.

The metal may be one of copper, ITO, and aluminum.

The reinforcement layer may be formed of a plurality of layers.

DETAILED DESCRIPTION

Figure 1:
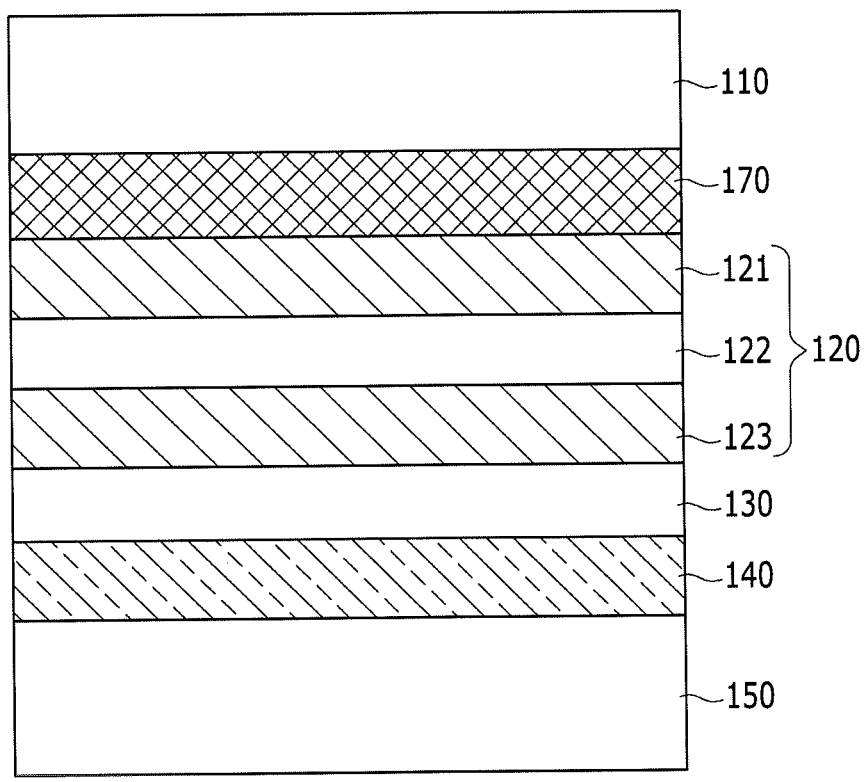
FIG. 1 illustrates a cross-sectional view of a touch panel display device according to a first exemplary embodiment.

Hereinafter, the embodiments will be described more fully hereinafter with reference to the accompanying drawings, in which exemplary embodiments are shown. As those skilled in the art would realize, the described embodiments may be modified in various different ways, all without departing from the spirit or scope thereof. The drawings and description are to be regarded as illustrative in nature and not restrictive. Like reference numerals designate like elements throughout the specification.

In addition, the size and thickness of each component shown in the drawings are arbitrarily shown for understanding and ease of description, but the embodiments are not limited thereto.

In the drawings, the thickness of layers, films, panels, regions, etc., may be exaggerated for clarity. In the drawings, for understanding and ease of description, the thickness of some layers and areas is exaggerated. It will be understood that when an element such as a layer, film, region, or substrate is referred to as being "on" another element, it can be directly on the other element or intervening elements may also be present.

In addition, unless explicitly described to the contrary, the word "comprise" and variations such as "comprises" or "comprising", will be understood to imply the inclusion of stated elements but not the exclusion of any other elements. Further, in the specification, it will be understood that when an element such as a layer, film, region, or substrate is referred to as being "on" another element, it can be directly on the other element or intervening elements may also be present.

FIG. 1 illustrates a cross-sectional view of a touch panel display device according to a first exemplary embodiment.

Referring to FIG. 1, a touch panel display device according to the first exemplary embodiment is a display device that may help reduce and/or prevent damage to a touch panel caused by bending stress. The touch panel display device may include a display panel 150, a polarizing plate 140, a resin layer 130, a touch panel 120, a reinforcement layer 170, and a window 110.

According to the first exemplary embodiment, the display panel 150 may be a constituent element displaying an image. Hereinafter, the display panel 150 of the OLED display including an organic light emitting element will be described, but the embodiments are not limited thereto. The display panel described hereinafter may include a display panel of a liquid crystal display device, a plasma display panel device, an electric field effect display device, or an electrophoretic display device.

Figure 2:
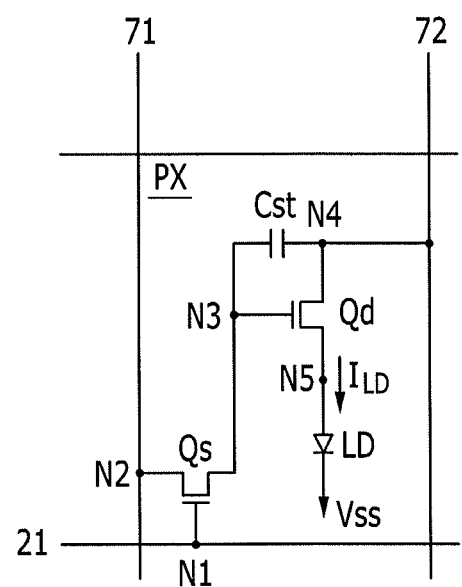
FIG. 2 illustrates an equivalent circuit of a pixel of a display panel shown in FIG. 1.
Figure 3:
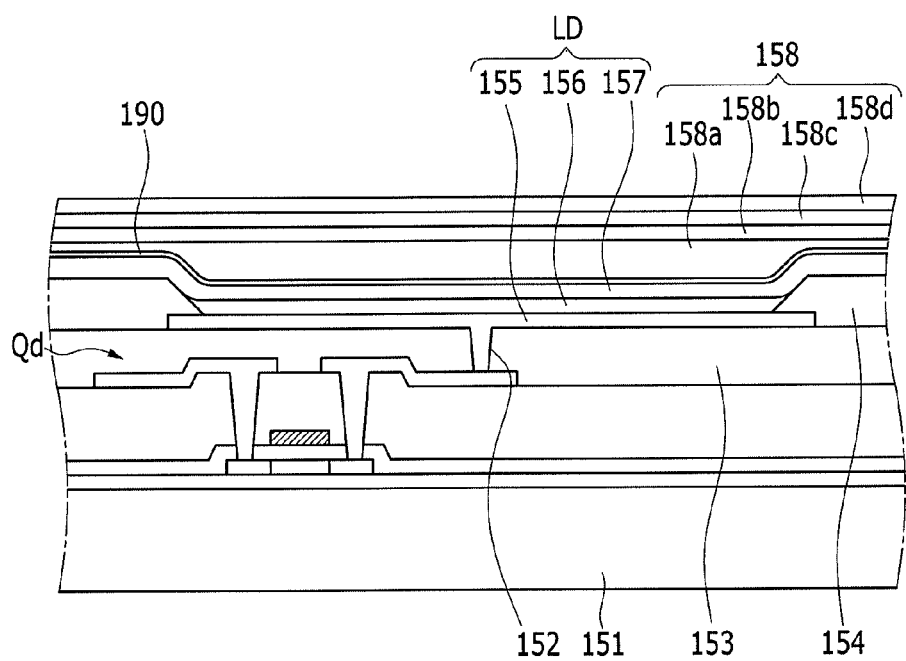
FIG. 3 illustrates a cross-sectional view of the display panel of FIG. 1.

FIG. 2 illustrates an equivalent circuit diagram of a pixel of the display panel of FIG. 1 and FIG. 3 illustrates a cross-sectional view of the display panel of FIG. 1.

Referring to FIG. 2, the display panel 150 may include a plurality of signal lines 21, 71, and 72 and a pixel PX connected to the signal lines. The pixel PX may be one of a red pixel R, a green pixel G, and a blue pixel B.

The signal line may include scanning signal lines 21 transmitting a gate signal (or, a scan signal), data lines 71 transmitting a data signal, and driving voltage lines 72 transmitting a driving voltage. The scanning signal lines 21 may be extended substantially in a row direction and almost parallel with each other, and the data lines 71 may be extended substantially in a column direction and almost parallel with each other. The driving voltage lines 72 are illustrated to be extended substantially in a column direction, but they may be extended in a row or column direction or formed mesh-shaped.

One pixel PX may include a switching transistor Qs, a driving transistor Qd, a storage capacitor Cst, and an organic light emitting element LD.

The switching transistor Qs may include a control terminal N1, an input terminal N2, and an output terminal N3, and the control terminal N1 is connected to the scanning signal line 21, the input terminal N2 is connected to the data line 71, and the output terminal N3 is connected to the driving transistor Qd. The switching transistor Qs may transmit a data signal received from the data line 17 to the driving transistor Qd in response to the scan signal received from the scanning signal line 21.

The driving transistor Qd may also include a control terminal N3, an input terminal N4, and an output terminal N5, and the control terminal N3 is connected to the switching transistor Qs, the input terminal N4 is connected to the driving voltage line 72, and the output terminal N5 is connected to the organic light emitting element LD. The driving transistor Qd may flow an output current ILD of which the magnitude varies according to a voltage between the control terminal N3 and the output terminal N5.

The capacitor Cst may be connected between the control terminal N3 and the input terminal N4 of the driving transistor Qd. The capacitor Cst may charge a data signal applied to the control terminal N3 of the driving transistor Qd and maintains charging of the data signal after the switching transistor Qs is turned off.

The organic light emitting element LD, e.g., an organic light emitting diode (OLED), may have an anode connected to the output terminal N5 of the driving transistor Qd and a cathode connected to a common voltage Vss. The organic light emitting element LD may emit light in different intensities according to an output current of the driving transistor Qd, thereby displaying an image. The organic light emitting display device LD may include an organic material that inherently emits any one or at least one light of three primary colors of red, green, and blue, or may include an organic material that emits white, and the organic light emitting display device shows a desired image by a spatial sum of these colors.

The switching transistor Qs and the driving transistor Qd may be n-channel electric field effect transistors (FETs), but at least one of the switching transistor Qs and the driving transistor Qd may be a p-channel electric field effect transistor. Also, a connection relation of the transistors (Qs and Qd), the capacitor Cst, and the organic light emitting diode LD may be changed.

Next, a cross-section of the display panel 150 will be described in further detail with reference to FIG. 3.

Referring to FIG. 3, the driving transistor Qd may be formed on an insulation substrate 151 that can be made of, e.g., transparent glass or plastic. A plurality of signal lines (not shown) and a plurality of switching transistors (not shown) may further be formed on the insulation substrate 151.

A protective layer 153 that may be made of an inorganic material or an organic material may be formed on the driving transistor Qd. When the protective layer 153 is made of an organic material, the protective layer may have a smooth surface. A contact hole 152 that partially exposes the driving transistor Qd may be formed in the protective layer 153. A pixel electrode 155 may be formed on the protective layer 153. The pixel electrode 155 may include a reflective electrode and a transparent electrode formed on the reflective electrode. The reflective electrode may be made of highly reflective metal such as sliver (Ag) or aluminum (Al) or an alloy thereof, and the transparent electrode may be made of a transparent conductive oxide such as indium tin oxide (ITO) or indium zinc oxide (IZO).

A pixel defining layer 154 may be formed covering the periphery area of the edge of the pixel electrode 155 on the protective layer 153.

An organic emission layer 156 may be formed on the pixel electrode 155, and a common electrode 157 may be formed on the organic emission layer 156 and the pixel defining layer 154.

The organic emission layer 156 may further include an emission layer (not shown) where light is substantially emitted and organic layers (not show) for efficient transmission of carriers of holes or electrodes to the emission layer. The organic layers may include a hole injection layer HIL and a hole transport layer HTP provided between the pixel electrode 155 and the emission layer and an electron injection layer EIL and an electron transport layer ETL provided between the common electrode 157 and the emission layer.

An overcoat 190 may be formed as an organic layer to protect the common electrode 157 by covering the same.

A thin film encapsulation layer 400 may be formed on the overcoat 190. The thin film encapsulation layer 400 may help protect the organic light emitting element EL and the driving circuit formed in the substrate 151 from an external environment by sealing.

The thin film encapsulation layer 400 may include encapsulation organic layers 158$a$ and 158$v$ and encapsulation inorganic layers 158$b$ and 158$d$, and they may be alternately layered. FIG. 3 exemplarily illustrates that two encapsulation organic layers 158$a$ and 158$c$ and two encapsulation inorganic layers 158$b$ and 158$d$ are alternately layered to form the thin film encapsulation layer 40, but the embodiments are not limited thereto.

Referring to FIG. 1, the polarizing plate 140 may be disposed on an upper side of the display panel 150. The polarizing plate 14 may change an optical axis of light passed through the display panel 150 and then emitted to the outside. In general, the polarizing plate may be formed in a structure in which a transparent protection film is layered to both sides or one side of a polarizer that is formed of a polyvinylalcohol-based resin.

For example, the polarizing plate 140 may have a structure in which molecule chains of poly vinyl alcohol (hereinafter, referred to as PVA) are aligned in a constant direction and a tri-acetyl cellulose (TAC) film, as a protective film, is bonded to a polarizer including an iodine-based compound or a dichroic polarizing material. In this case, the polarizer and the protective film may be bonded to each other by an aqueous adhesive made of a PVA-based solution, in general.

However, the polarizing plate 140 is not limited thereto, and the structure of the polarizing plate may be variously changed.

A resin layer 130 may be formed on an upper portion of the polarizing plate 140. The resin layer 130 may bond a touch panel 120 (spaced apart from an upper side of the polarizing plate 140) and the polarizing plate 140. In this case, the resin layer 130 may be formed by curing a liquid resin.

According to the first exemplary embodiment, the touch panel 120 may be spaced apart from the upper side of the polarizing plate 140 and may sense an external touch input. In an implementation, a capacitive-type touch panel may be employed as the touch panel 120. However, the touch panel 120 is not limited thereto, and a resistive type or an electromagnetic type touch panel may be employed.

Referring to FIG. 1, the touch panel 120 may be a typical capacitive type touch panel, and may include a first insulation layer 123, an electrode portion 122, and a second insulation layer 121.

The first insulation layer 123 may be a constituent element that functions as a substrate, and an insulating substrate such as glass or PET may be used.

The electrode portion 122 formed on an upper side of the first insulation layer 123 may be formed of a plurality of X electrodes (not shown) and a plurality of Y electrodes (not shown) respectively arranged in the X direction and the Y direction when viewed from the top.

In this case, the plurality of X and Y electrodes may detect change in capacitance of each electrode due to finger touch. The electrode portion 122 may be made of a highly transmissive material, e.g., a transparent conductive material such as indium tin oxide (ITO).

The second insulation layer 121 may be provided on an upper side of the electrode portion 122 to protect the electrode portion 122. In this case, the second insulation layer 121 may be formed of an insulating material such as PET.

Meanwhile, the window 110 may be disposed on an upper side of the touch panel 120. The window 110 may help protect the touch panel 120 and the display panel 150 on a lower side of the window 110.

According to the first exemplary embodiment, a reinforcement layer 170 may be formed between the touch panel 120 and the window 110. However, the location of the reinforcement layer 170 is not limited thereto, and may be provided, e.g., between the window 110 and the touch panel 120 and/or between the touch panel 120 and the resin layer 130.

In this case, the reinforcement layer 170 may help prevent the touch panel 120 from being damaged due to stress generated when the display device is bent.

As previously described, cracks may be formed in the electrode formed in the electrode portion 122 due to the bending stress. For example, when a more than predetermined level of bending stress is transmitted to the touch panel 120, the electrode of the touch panel 120 may be damaged, thereby causing an operation failure of the touch panel 120.

Thus, in order to prevent damage to the touch panel 120 due to the bending stress, a reinforcement layer 170 may be formed on an upper or lower side of the touch panel 120 to help reduce the bending stress.

Figure 4:
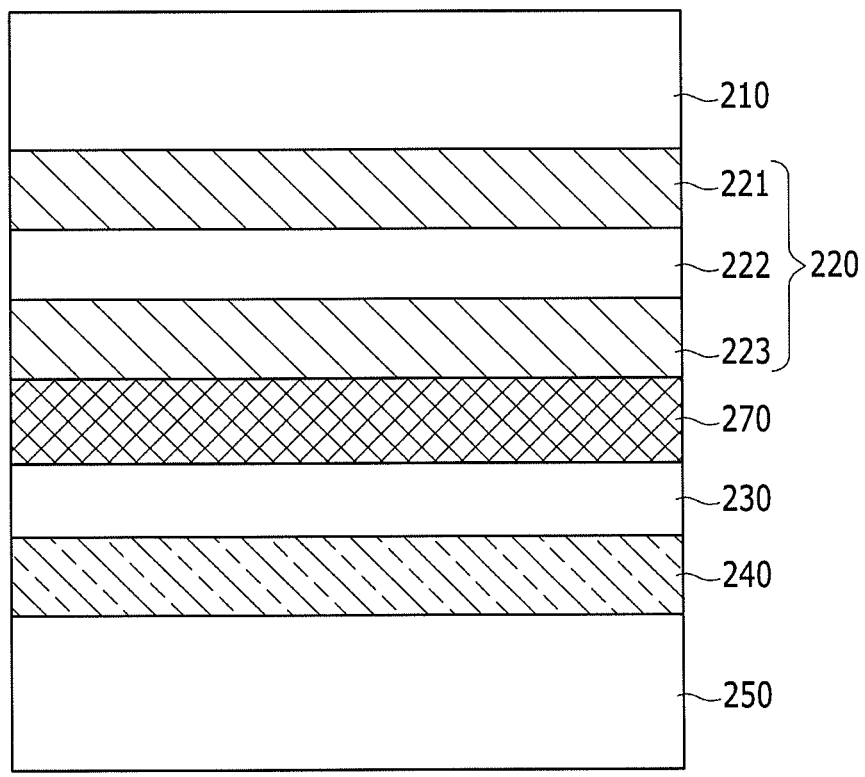
FIG. 4 illustrates a cross-sectional view of a touch panel display device according to a second exemplary embodiment.
Figure 5:
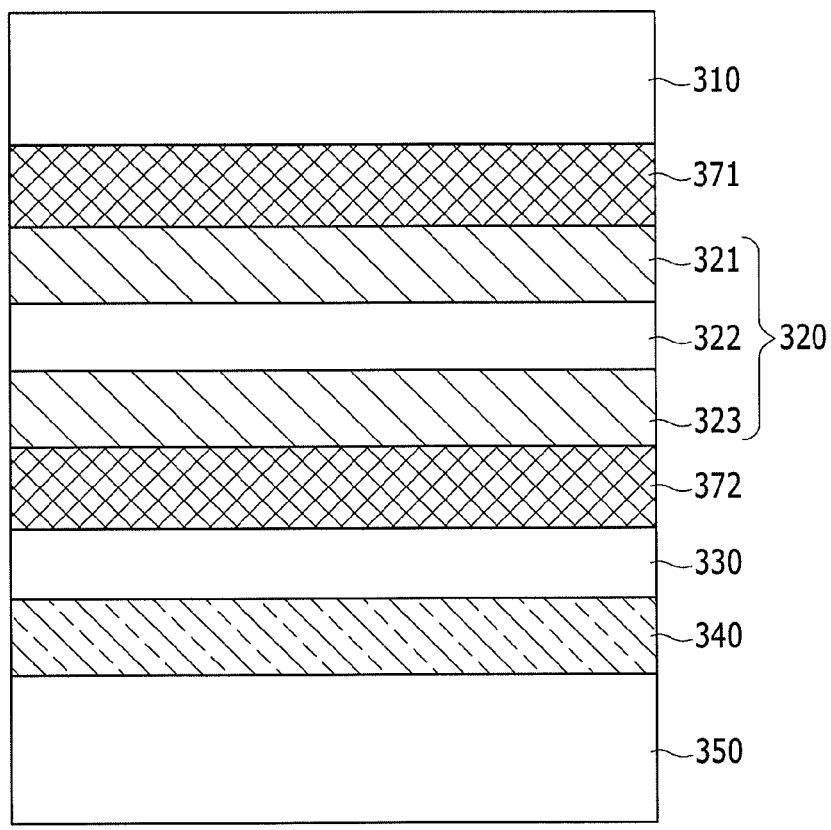
FIG. 5 illustrates a cross-sectional view of a touch panel display device according to a third exemplary embodiment.

FIG. 4 illustrates a cross-sectional view of a touch panel display device according to a second exemplary embodiment, and FIG. 5 illustrates a cross-sectional view of a touch panel display device according to a third exemplary embodiment.

Referring to FIG. 4, a touch panel display device according to the second exemplary embodiment may include a reinforcement layer 270 formed on a lower side of a touch panel 220, e.g., between the touch panel 220 and a resin layer 230. For example, unlike in the first exemplary embodiment, the reinforcement layer 270 may be disposed on the lower side of the touch panel 220 in the second exemplary embodiment.

Referring to FIG. 5, a touch panel display device according to the third exemplary embodiment may include reinforcement layers 371 and 372 formed between an upper side and a lower side of a touch panel 320, e.g., between a window 310 and a touch panel 320 and between the touch panel 320 and a resin layer 330. The reinforcement layers 371 and 372 may be disposed on the upper and lower sides of the touch panel 320, and thus when bending occurs in the display device, the bending stress transmitted to the touch panel 320 may be further reduced.

In an implementation, the reinforcement layer 170 may be made of a polysilicon or oxide semiconductor.

For example, the oxide semiconductor may include any one of oxides having titanium (Ti), hafnium (Hf), zirconium (Zr), aluminum (Al), tantalum (Ta), germanium (Ge), zinc (Zn), gallium (Ga), tin (Sn), or indium (In) as a base, and/or complex oxides thereof, such as zinc oxide (ZnO), indium-gallium-zinc oxide (InGaZnO$_4$), indium-zinc oxide (Zn—In—O), zinc-tin oxide (Zn—Sn—O) indium-gallium oxide (In—Ga—O), indium-tin oxide (In—Sn—O), indium-zirconium oxide (In—Zr—O), indium-zirconium-zinc oxide (In—Zr—Zn—O), indium-zirconium-tin oxide (In—Zr—Sn—O), indium-zirconium-gallium oxide (In—Zr—Ga—O), indium-aluminum oxide (In—Al—O), indium-zinc-aluminum oxide (In—Zn—Al—O), indium-tin-aluminum oxide (In—Sn—Al—O), indium-aluminum-gallium oxide (In—Al—Ga—O), indium-tantalum oxide (In—Ta—O), indium-tantalum-zinc oxide (In—Ta—Zn—O), indium-tantalum-tin oxide (In—Ta—Sn—O), indium-tantalum-gallium oxide (In—Ta—Ga—O), indium-germanium oxide (In—Ge—O), indium-germanium-zinc oxide (In—Ge—Zn—O), indium-germanium-tin oxide (In—Ge—Sn—O), indium-germanium-gallium oxide (In—Ge—Ga—O), titanium-indium-zinc oxide (Ti—In—Zn—O), and hafnium-indium-zinc oxide (Hf—In—Zn—O).

The reinforcement layer 170 may be made of a mixed material of an oxide semiconductor and a metal or metal compound. In this case, the metal or metal compound may be at least one of copper, ITO, and aluminum.

Figure 6:
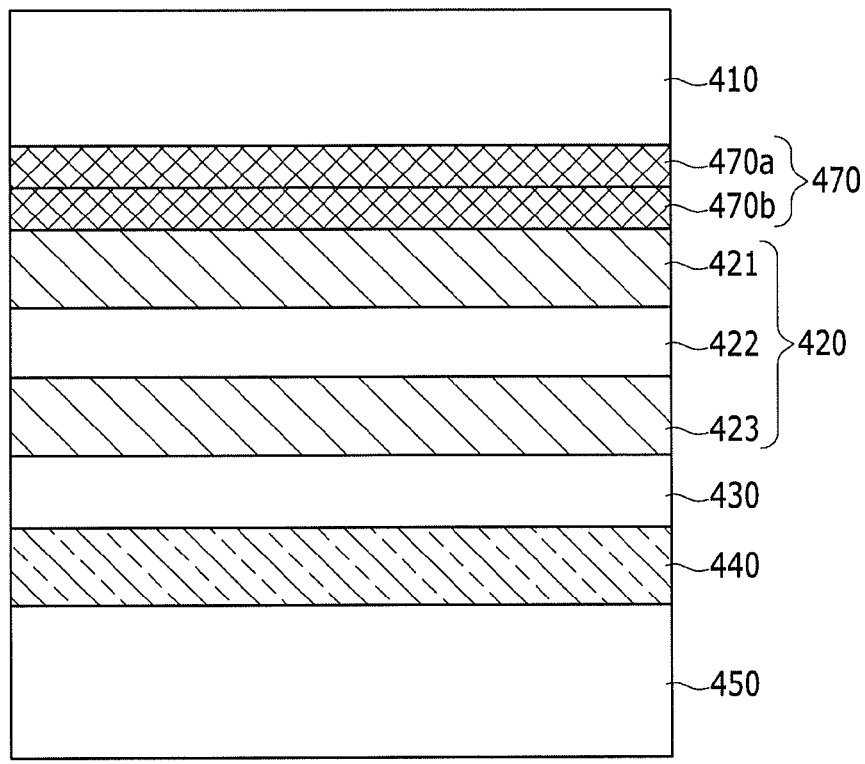
FIG. 6 illustrates a cross-sectional view of a touch panel display device according to a fourth exemplary embodiment.

According to a fourth exemplary embodiment, a reinforcement layer 470 may be formed as a plurality of layers as shown in FIG. 6. For example, the reinforcement layer 470 may be formed of a first reinforcement layer 470a and a second reinforcement layer 470b.

In this case, the first reinforcement layer 470a and the second reinforcement layer 470b may be made of the same material or respectively made of different materials. For example, the first reinforcement layer 470a and the second reinforcement layer 470b may be made of oxide semiconductors, or they may be made of a mixed material of an oxide semiconductor and a metal or metal compound.

Alternatively, the first reinforcement layer 470a and the second reinforcement layer 470b may respectively be made of different materials. For example, one may be made of an oxide semiconductor and the other may be made of a mixed material of an oxide semiconductor and a metal or metal compound.

By way of summation and review, an ITO layer may be deposited in the touch panel, and when the touch panel is bent, the ITO layer may be broken or damaged due to bending stress.

The touch panel display device according to the exemplary embodiments may include a reinforcement layer on at least one of an upper side and a lower side of the touch panel. Thus when the display device is bent, the touch panel may be prevented from being damaged due to bending stress.

According to an exemplary embodiment, when bending occurs in a touch panel used in a display device, breakage or damage to the display panel due to bending stress may be reduced and/or prevented.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of symbols>

| | |
|---|---|
| 21: scan signal line | 71: data line |
| 72: driving voltage line | 121: second insulation layer |
| 122: electrode portion | 123: first insulation layer |
| 110, 210, 310, 410: window | 120, 220, 320, 420: touch panel |
| 130, 230, 330, 430: resin layer | |
| 140, 240, 340, 440: polarizing plate | |
| 150, 250, 350, 450: display panel | 151: insulation substrate |
| 152: contact hole | 153: protective layer |
| 155: pixel electrode | 156: organic emission layer |
| 157: common electrode | 158: organic layer |
| 170, 270, 370, 470: reinforcement layer | |

What is claimed is:

1. A touch panel display device, comprising:
a display panel displaying an image;
a polarizing plate attached onto the display panel;
a touch panel on and spaced apart from an upper portion of the polarizing plate;
a resin layer between the touch panel and the polarizing plate, the resin layer bonding the touch panel and the polarizing plate;
a window on the touch panel; and
a reinforcement layer disposed at least between the window and the touch panel and between the touch panel and the resin layer, or both,
wherein the reinforcement layer:
prevents damage to the touch panel caused by bending stress, and
includes an oxide semiconductor.

2. The touch panel display device of claim 1, wherein the reinforcement layer further includes a metal or metal compound.

3. The touch panel display device of claim 2, wherein the metal or metal compound includes at least one of copper, ITO, or aluminum.

4. The touch panel display device of claim 1, wherein the oxide semiconductor includes at least one of:
an oxide having zinc, gallium, tin, or indium as a base, or
a complex oxide of zinc, gallium, tin, or indium.

5. The touch panel display device of claim 4, wherein the complex oxide includes at least one of indium-gallium-zinc oxide, indium-zinc oxide, or zinc-tin oxide.

6. The touch panel display device of claim 1, wherein the reinforcement layer includes a plurality of layers.

7. The touch panel display device of claim 6, wherein at least two layers of the plurality of layers are different from each other.

8. The touch panel display device of claim 1, wherein the oxide semiconductor includes an oxide having titanium, hafnium, zirconium, aluminum, tantalum, germanium, zinc, gallium, tin, or indium as a base.

9. The touch panel display device of claim 1, wherein the oxide semiconductor includes one of zinc oxide (ZnO), indium-gallium-zinc oxide ($InGaZnO_4$), indium-zinc oxide (Zn—In—O), zinc-tin oxide (Zn—Sn—O) indium-gallium oxide (In—Ga—O), indium-tin oxide (In—Sn—O), indium-zirconium oxide (In—Zr—O), indium-zirconium-zinc oxide (In—Zr—Zn—O), indium-zirconium-tin oxide (In—Zr—Sn—O), indium-zirconium-gallium oxide (In—Zr—Ga—O), indium-aluminum oxide (In—Al—O), indium-zinc-aluminum oxide (In—Zn—Al—O), indium-tin-aluminum oxide (In—Sn—Al—O), indium-aluminum-gallium oxide (In—Al—Ga—O), indium-tantalum oxide (In—Ta—O), indium-tantalum-zinc oxide (In—Ta—Zn—O), indium-tantalum-tin oxide (In—Ta—Sn—O), indium-tantalum-gallium oxide (In—Ta—Ga—O), indium-germanium oxide (In—Ge—O), indium-germanium-zinc oxide (In—Ge—Zn—O), indium-germanium-tin oxide (In—Ge—Sn—O), indium-germanium-gallium oxide (In—Ge—Ga—O), titanium-indium-zinc oxide (Ti—In—Zn—O), or hafnium-indium-zinc oxide (Hf—In—Zn—O).

* * * * *